(12) United States Patent
Wang

(10) Patent No.: US 11,947,650 B2
(45) Date of Patent: *Apr. 2, 2024

(54) BIOMETRIC DATA SECURITY SYSTEM AND METHOD

(71) Applicant: VISA INTERNATIONAL SERVICE ASSOCIATION, San Francisco, CA (US)

(72) Inventor: Quan Wang, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,001

(22) Filed: Sep. 29, 2022

(65) Prior Publication Data

US 2023/0017976 A1    Jan. 19, 2023

Related U.S. Application Data

(63) Continuation of application No. 16/755,849, filed as application No. PCT/US2017/057236 on Oct. 18, 2017, now Pat. No. 11,487,858.

(51) Int. Cl.
*G06F 21/32* (2013.01)
*G06F 21/60* (2013.01)
(Continued)

(52) U.S. Cl.
CPC ............ *G06F 21/32* (2013.01); *G06F 21/602* (2013.01); *G06F 21/6218* (2013.01);
(Continued)

(58) Field of Classification Search
CPC .... G06F 21/32; G06F 21/602; G06F 21/6218; G06F 21/107; G06V 10/751;
(Continued)

(56) References Cited

U.S. PATENT DOCUMENTS 6,167,517 A    12/2000 Gilchrist et al.
6,393,139 B1 *  5/2002 Lin ........................... G07C 9/37
                                                        382/125

(Continued)

OTHER PUBLICATIONS

Application No. EP17929164.6, Extended European Search Report, dated Sep. 30, 2020, 7 pages.
(Continued)

*Primary Examiner* — Meng Li
(74) *Attorney, Agent, or Firm* — Kilpatrick Townsend & Stockton LLP

(57) ABSTRACT

Embodiments of the invention are directed to a method. The method may include transmitting, by a first device, an encrypted first biometric template generated from a first biometric sample of a user of the first device to a second device, wherein the second device inputs the encrypted first biometric template and a second biometric template generated from a second biometric sample of the user into a function to generate an encoded output. The first device may receive the encoded output from the second device, and may decode the encoded output to recover the encrypted first biometric template and the second biometric template of the user. Upon determining a match result between first and second biometric templates, the first device may transmit unique data to the second device.

20 Claims, 5 Drawing Sheets

(51) Int. Cl.
  *G06F 21/62* (2013.01)
  *G06V 10/75* (2022.01)
  *G06V 40/16* (2022.01)
  *H04L 9/06* (2006.01)
  *H04L 9/40* (2022.01)
  *G06F 21/10* (2013.01)

(52) U.S. Cl.
  CPC .......... *G06V 10/751* (2022.01); *G06V 40/172* (2022.01); *H04L 9/0625* (2013.01); *H04L 63/0435* (2013.01); *G06F 21/107* (2023.08)

(58) Field of Classification Search
  CPC . G06V 40/172; H04L 9/0625; H04L 63/0435; H04L 2209/56; H04L 9/0866; H04L 9/0894; H04L 9/3218; H04L 63/0442; H04L 2463/062; H04L 9/3231; H04L 63/0861
  See application file for complete search history.

(56) References Cited

U.S. PATENT DOCUMENTS

| | | | | |
|---|---|---|---|---|
| 6,606,385 | B1 * | 8/2003 | Aikawa | H04L 9/0625 380/28 |
| 6,697,947 | B1 * | 2/2004 | Matyas, Jr. | H04L 9/3247 713/180 |
| 7,325,141 | B2 * | 1/2008 | Chow | G06F 21/31 713/182 |
| 9,984,366 | B1 * | 5/2018 | Jammikunta | G06Q 20/0457 |
| 11,736,296 | B2 * | 8/2023 | Wang | H04L 9/0637 |
| 2004/0078775 | A1 | 4/2004 | Chow et al. | |
| 2005/0222932 | A1 * | 10/2005 | Murashita | G06Q 20/3821 705/35 |
| 2007/0095900 | A1 * | 5/2007 | Kingsley-Hefty | G06F 21/32 235/382 |
| 2007/0255963 | A1 * | 11/2007 | Pizano | G06F 21/32 713/189 |
| 2008/0091833 | A1 * | 4/2008 | Pizano | H04L 63/0861 709/229 |
| 2013/0339749 | A1 * | 12/2013 | Spuehier | H04L 9/3231 713/186 |
| 2016/0119138 | A1 | 4/2016 | Pizano et al. | |
| 2016/0373417 | A1 | 12/2016 | Mandal et al. | |
| 2017/0104723 | A1 | 4/2017 | Merritt | |
| 2017/0220794 | A1 | 8/2017 | Beatson et al. | |
| 2017/0353310 | A1 * | 12/2017 | Guasch Castelló | H04L 9/3218 |
| 2018/0018593 | A1 * | 1/2018 | Benavides | G08B 21/0288 |
| 2018/0234414 | A1 * | 8/2018 | Littrell | G06F 21/33 |
| 2019/0005242 | A1 * | 1/2019 | Agarwal | G06F 21/566 |
| 2019/0012673 | A1 * | 1/2019 | Chakraborty | G07D 7/206 |
| 2019/0220582 | A1 * | 7/2019 | Humborstad | G06F 21/32 |
| 2020/0279269 | A1 * | 9/2020 | Wagner | G06V 40/50 |
| 2020/0293643 | A1 * | 9/2020 | Wang | H04L 9/0866 |
| 2021/0097166 | A1 * | 4/2021 | Arora | H04L 63/0861 |
| 2021/0342967 | A1 * | 11/2021 | Popov | G06V 40/10 |

OTHER PUBLICATIONS

Application No. PCT/US2017/057236, International Search Report and Written Opinion, dated Jul. 16, 2018, 12 pages.
Application No. EP17929164.6, Office Action, dated Nov. 7, 2023, 7 pages.

* cited by examiner

BIOMETRIC DATA SECURITY SYSTEM AND METHOD

CROSS-REFERENCES TO RELATED APPLICATIONS

This application is a continuation application of U.S. application Ser. No. 16/755,849, filed Apr. 13, 2020, which is a 371 application of International Application No. PCT/US2017/057236, filed Oct. 18, 2017, the disclosures of which are hereby incorporated by reference in their entirety for all purposes.

BACKGROUND

In todays technological environment, it is common for users to transmit data between devices. At times, the data may be sensitive and should only be transmitted if the user is authorized. Typically, for a device to know if a user is authorized, the user must present credentials to the device such as a password or PIN. Another way to identify the user, is through biometric verification. Conventional biometric verification systems may transmit a biometric sample from a first device to a second device. The second device may receive the user's biometric sample and it can be compared to the transmitted biometric sample. Such conventional processes expose the biometric sample to man-in-the-middle attacks. Biometric verification should be performed in a way that is secure, and does not expose the user's biometric data in the clear where it can be illegally obtained by a criminal and used to impersonate the legitimate user.

Embodiments of the invention address this and other problems individually and collectively.

BRIEF SUMMARY

Embodiments of the invention are directed to systems and methods for protecting biometric data.

One embodiment of the invention can be directed to a method. The method may comprise transmitting, by a first device, an encrypted first biometric template generated from a first biometric sample of a user of the first device to a second device, where the second device inputs the encrypted first biometric template and a second biometric template generated from a second biometric sample of the user into a function to generate an encoded output. The first device may receive the encoded output from the second device, and may decode the encoded output to recover the encrypted first biometric template and the second biometric template of the user. The method may further comprise decrypting, by the first device, the encrypted first biometric template and comparing, by the first device, the decrypted first biometric template and second biometric template to determine a match result. Upon determining the match result, the first device may transmit unique data to the second device.

In another embodiment, the method further comprises storing, by the first device, the unique data and receiving a first biometric sample from the user of the first device. The first device may generate a first biometric template of the user from the first biometric sample, and may encrypt and store the first biometric template.

Another embodiment of the invention is directed to a first device. The first comprises: a processor; and a computer readable medium storing code executable by the processor. The code comprises instructions for implementing a method including: transmitting an encrypted first biometric template generated from a first biometric sample of a user of the first device to a second device, wherein the second device inputs the encrypted first biometric template and a second biometric template generated from a second biometric sample of the user into a function to generate an encoded output; receiving the encoded output from the second device; decoding the encoded output to recover the encrypted first biometric template and the second biometric template of the user; decrypting the encrypted first biometric template; comparing the decrypted first biometric template and second biometric template to determine a match result; and transmitting unique data to the second device based on the match result.

These and other embodiments of the invention can be described with reference to the following detailed description and the accompanying drawings.

TERMS

Figure 1:
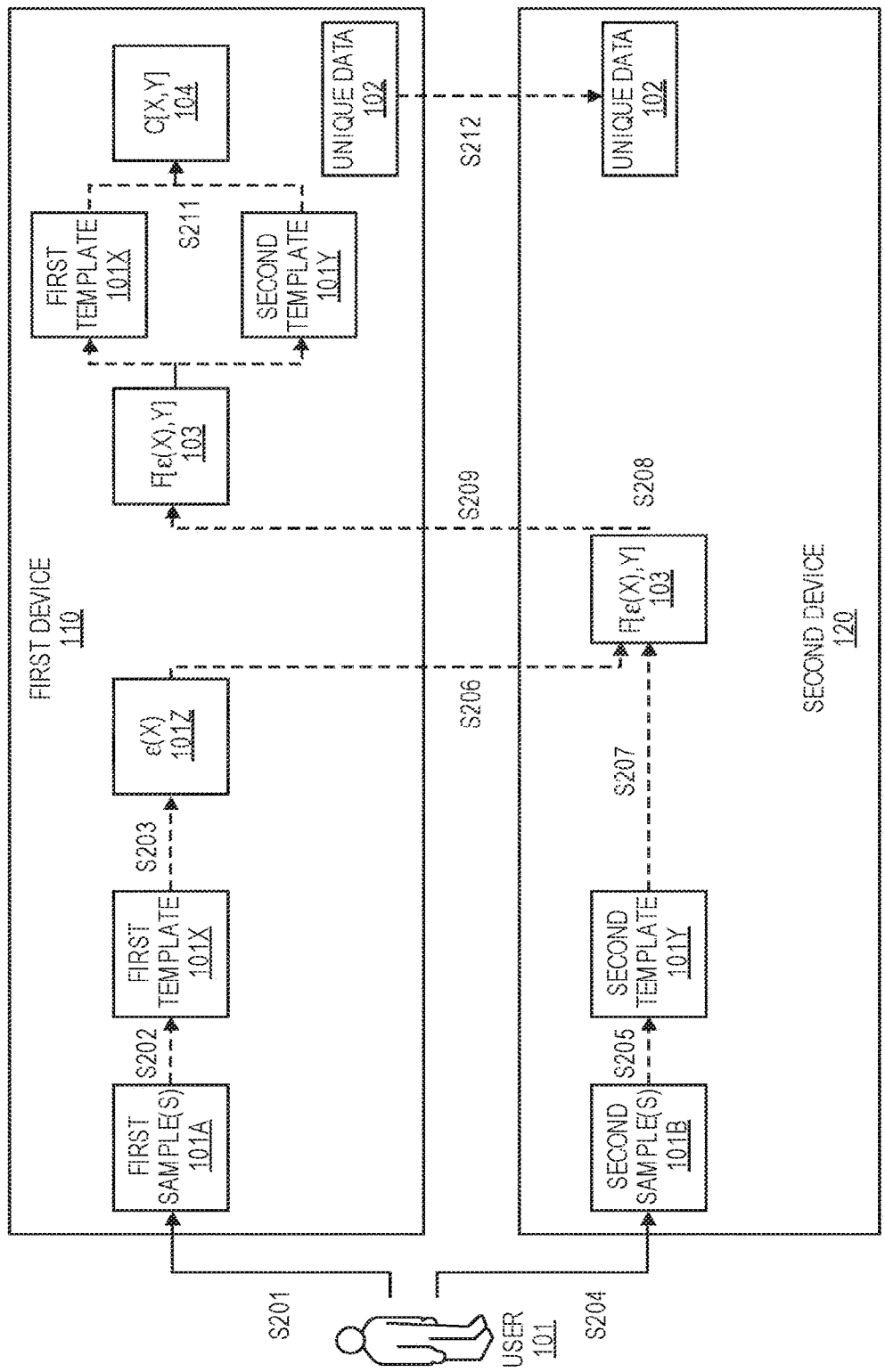
FIG. 1 shows a block diagram of a first device and second device performing biometric verification according to an embodiment of the invention.

Prior to discussing embodiments of the invention, some descriptions of some terms may be useful.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

"Authentication" may include a process of verifying the identity of something (e.g., a user). One form of authentication can be "biometric authentication". Biometric authentication can also be referred to as "biometric verification."

A "biometric" may be any human characteristic that is unique to an individual. For example, a biometric may be a person's fingerprint, face, DNA, voiceprint, etc.

A "biometric reader" may refer to a device for capturing data from an individual's biometric sample. Examples of biometric readers may include fingerprint readers, front-facing cameras, microphones, and iris scanners.

A "biometric sample" may include data representing a biometric. The data representing the biometric may have been obtained by a biometric reader. The data may be either an analog or digital representation of the user's biometric, generated prior to determining distinct features needed for matching. For example, a biometric sample of a user's face may be image data. In another example, a biometric sample of a user's voice may be an audio file.

A "biometric template" may include a file containing distinct characteristics extracted from a biometric sample that may be used during a biometric authentication process. For example, a biometric template may be data representing the unique features of an individual's fingerprint, eye, hand or voice needed for performing accurate authentication of the individual.

A "zero-knowledge proof" or "zero-knowledge protocol" may include a method of proving information is true without conveying the actual information itself. In a zero-knowledge protocol, secret information can be verified without be revealed. More information regarding zero-knowledge proofs may be found at:

J. Camenisch and M. Stadler. Proof systems for general statements about discrete logarithms. Technical Report TR 260, institute for Theoretical Computer Science, ETH Zürich, March 1997.

DETAILED DESCRIPTION

Embodiments are directed to methods, devices, and systems for securely performing biometric verification. As previously explained, biometric verification can be used to authenticate a user attempting to transmit sensitive and unique data stored on a first device to a second device. The user may possess a first device storing the unique data, which may be transmitted to a second device once the first device has determined that the user is present and is authorized access. According to some embodiments, biometric data of the user is encrypted and/or encoded on the first and/or second devices, such that the user's biometric cannot be stolen.

FIG. 1 shows a block diagram of a system comprising first device and second device performing a biometric verification process according to an embodiment of the invention. A user 101 may use operate the first device 110 and may use the second device 120 to obtain a resource of some kind and access a secure location. The user 101 may own or operate the first device 110, which may store unique data 102. Examples of first device 110 may include mobile phones, laptops, hand-held devices, personal computers, Internet of Things or "IOT" devices, vehicles (e.g., cars), wearable electronic devices, or any other computing device capable of sending, receiving, and storing data, such as unique data 102. Examples of unique data 102 may include private data of a user. Specific examples of unique data may include the user's name, address, or other personal information. Other specific examples of unique data may include access credentials such as login credentials (e.g. username and password), work credentials (e.g. employee ID, position, level of security clearance, etc.) or payment credentials (e.g. bank account information, credit card details, payment tokens, etc.).

According to some embodiments of the invention, the first device 110 may be in communication with a second device 120. The second device 120, similar to first device 110, may be a computing device capable of sending, receiving, and storing data. In one embodiment, second device 120 may be a device capable of controlling access to a resource. The resource may be, for example, entry into a physical or virtual environment, such as entry into a building, room, database, or computer network. As another example, the resource may be goods, services, and/or assets that can be purchased or exchanged. For example the resource can be a physical item for consumption (e.g. food, water, fuel, etc.), temporary control of an object or service (e.g. temporary control of a vehicle or appliance), or can be a digital asset (e.g. music files, web content, digital currency, etc.). In one embodiment, access to the resource by user 101 may be authorized upon transmission of unique data 102 from first device 110 to second device 120.

According to embodiments, permission to transmit unique data 102 from first device 110 to second device 120 may be controlled and restricted by a performance of a successful biometric verification process. In one embodiment, the requesting user 101 may be required to present his or her biometric sample to second device 120. The biometric sample that is presented to the second device 120 may be matched to a biometric template stored at first device 110. If the first device 110 determines that a match is present, the user will be authorized and will have permission to access the unique data and to provide it from the first device 110 to the second device 120. For example, second device 120 may be capable of scanning user's face and/or fingerprint, which can be matched to a digital file of the user's unique facial or fingerprint features stored on first device 110. Upon successful matching, the first device can be sure that the authorized user 101 is present, and may transmit the unique data 102 to second device 120 upon the user's request.

Figure 2:
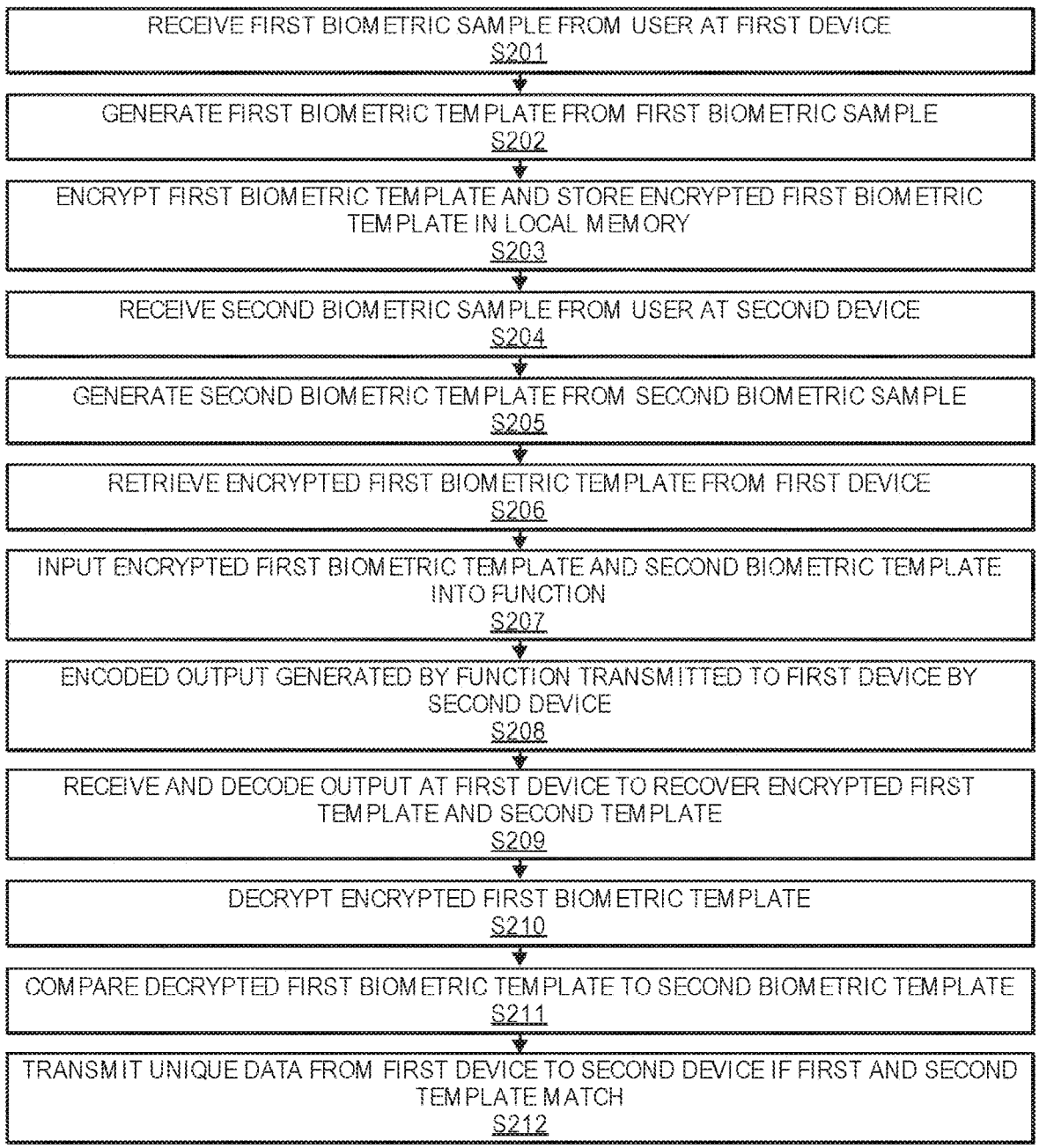
FIG. 2 shows a flowchart for a method of performing biometric verification according to embodiments of the invention.

The flow of data according to embodiments of the invention is shown in FIG. 1 and is described in further detail by the flowchart and description of FIG. 2. Referring to FIG. 1, the user may first present one or more sample(s) of his or her biometric to first device 110, as shown by first sample(s) 101A. The biometric sample(s) may be captured and processed as data using a biometric reader of the first device 110. For example, the user's face may be scanned using a camera or other imaging device coupled to a processor of first device 110, such that user's face data may be recorded as a digital file. It should be understood that any suitable biometric type may be implemented in order to carry out embodiments of the invention. Examples of other suitable forms of biometric sampling may include iris scanning, retinal scanning, voice recording, fingerprint reading, palm print reading, etc.

Upon capturing first sample(s) 101, a first biometric template (first template 101X) may be generated. The biometric template, first template 101X, may represent unique features of user's biometric sample (i.e. from first sample(s) 101) that can be used for matching biometrics and identifying user 101. The features may be extracted from first sample(s) 101A using a template generation algorithm to form a binary file or string of bits that is unique to the user 101. More information regarding biometric template generation may be found at:

C. Chen, R. N. J. Veidhuis, T. A. M. Kevenaar, A. H. M. Akkermans, "Multi-bits biometric string generation based on the likelihood ratio", Proc. IEEE Int. Conf. Biometrics Theory Appl. System, pp. 1-6, September 2007.

Once first template 101X has been created, first device 110 may encrypt the first biometric template 101X to generate encrypted template, $\varepsilon(X)$ 101Z. For example, the string of bits representing first template 101X may be passed through an encryption algorithm to form an encrypted template 101Z. In one embodiment, the encryption process may be performed using a symmetric key, which may be a unique string of characters that may be required to encrypt and decrypt $\varepsilon(X)$ 101Z. In other embodiments, encryption can be performed by a public key of a public-private key pair. The encryption key may be stored in a secure memory located on first device 110 or a remote memory accessible by first device 110. The encrypted template $\varepsilon(X)$ 101Z may then be stored by first device 110, and the original string of bits representing first template 101X may be removed from memory. Embodiments of the invention advantageously do not have to retain an actual biometric template or biometric sample in plaintext form on the first device 110.

At a later point in time, user 101 may wish to send unique data 102 from first device 110 to second device 120 in order to conduct an interaction or complete a particular task. For example, second device 120 may be a computer that controls access to a building, and unique data 102 may be the user's access credentials. As another example, second device 120 may be a point-of-sale terminal, and unique data 102 may be the user's payment information. In yet another example, second device 120 may be an IOT device (e.g. a vehicle, appliance, or climate control device) and unique data 102 may be user preferences and/or preferred device settings of user 101.

In embodiments, first device 110 may be required to confirm that user 101 is present and authorized to transmit unique data 102 to second device 102. This may be done by matching the first template 101X stored by first device 110 to a second template 101Y generated at second device 120. The second template 101Y may be generated from a second biometric sample of user 101, second sample(s) 101B, which may be captured by second device 120 upon interaction with user 101.

To begin the authorization process, user 101 may present second biometric sample(s) 101B to second device 120. For example, user 101 may use an image capturing device coupled to a processor of second device 120 (e.g. a camera), to generate a digital representation of his or her face (e.g. as an image or video file). As another example, user 101 may speak into an audio recording device coupled to second device 120 to generate a recording of his or her voice.

Second device 120 may then generate a second biometric template, which may be the second template 101Y, from second sample(s) 101B. For example, second template 101Y may comprise the same template generation algorithm used by first device 110 to generate first template 101X, and may similarly use the template generation algorithm to generate second template 101Y from extracted features of second sample(s) 101B.

Before or after the second template 101Y has been generated, second device 120 may then request an encrypted template, $\varepsilon(X)$ 101Z from the first device 110. Upon receiving the encrypted template, $\varepsilon(X)$ 101Z, from the first device 110, the second device 120 may generate an encoded output, $F[\varepsilon(X),Y]$, 103 from the encrypted template, $\varepsilon(X)$ 101Z and the second template 101Y. Function, F, conceals the values of the encrypted template, $\varepsilon(X)$ 101Z and the second template 101Y as a single value.

Second device 120 may then transmit the encoded output, $F[\varepsilon(X),Y]$, 103, to first device 110. First device 110 may receive the encoded output, $F[\varepsilon(X),Y]$, 103 and may decode $F[\varepsilon(X),Y]$ using a function $F^{-1}$ to recover the encrypted template, $\varepsilon(X)$, 103 and the second template 101Y. For example, first device 110 may have knowledge of the encoding function used by the second device 120 to generate the encoded output. $F[\varepsilon(X),Y]$ 103, and may be in possession of a reversing function $F^{-1}$ to recover second template 101Y. In some embodiments, the function F may be an encryption function and $F^{-1}$ may be its corresponding decryption function.

Upon recovering the encrypted template, $\varepsilon(X)$ 101Z and second template 101Y from $F[\varepsilon(X),Y]$ 103 using reversing function $F^{-1}$, first device 110 may then decrypt the locally stored encrypted first biometric template, $\varepsilon(X)$ 101Z to determine the first biometric template, first template 101X. For example, first device 110 may retrieve the symmetric key that was used to encrypt the first biometric template 101X, and may subsequently use the symmetric key to perform the decryption of the received encrypted template, $\varepsilon(X)$ 101X. If the first biometric template 101X was encrypted with a public key of a public-private key pair, then it can be decrypted with the corresponding private key. First device 110 may then compare a first biometric template 101X obtained by decrypting a locally stored encrypted template $\varepsilon(X)$ 101Z, to the first biometric template 101X obtained by decrypting the encrypted first biometric template $\varepsilon(X)$ received via the encoded output $F[\varepsilon(X),Y]$ 103. If there is a match, then the first device 110 knows that is it communicating with second device 120. If there is no match, then the first device 110 may not be communicating with the correct device, and further transmission of data between the first device 110 and the second device 120 may be prevented or terminated.

Thus, sending the encrypted first biometric template 101Z to the second device 120 has a number of advantages. First, sending the encrypted first biometric template 101Z can serve to verify that any communication received from the second device 120 is in response to a data transmission from the first device 110. Further, the encrypted first biometric template 101Z can be used to further obscure the second biometric template 101Y before it is transmitted from the second device 120 to the first device 110, thus ensuring that the second biometric template is protected.

in addition, the first device 110 may compare the first biometric template 101X obtained by decrypting the locally stored encrypted template $\varepsilon(X)$ 101Z, to the second template 101Y using a comparison function $C[X,Y]$ 104. For example, each character or value in a string or array representing first template 101X can be compared in sequence to a corresponding character or value in a string or array representing second template 101Y. Then, a positive match can be determined if a predetermined percentage (e.g., 90% or higher) of the two strings or arrays match. If the result of the comparison is that the first template 101X and second template 101Y match (i.e. positive match result), then the first device 110 can be sure that authorized user 101 is present during the current interaction with second device 120. The first device 110 may then transmit (e.g., over the air) the unique data 102 to second device 120 as requested by user 101. Steps S201 through S210 are further detailed in flowchart 200 of FIG. 2.

FIG. 2 shows a flowchart for a method of performing biometric verification according to embodiments of the invention. As described below, the user may first enroll his or her biometric template into a first device as a means for controlling access to unique data on the first device. In particular, the unique data stored by the first device may be data that can only be accessed if an authorized user is present. The first device may be any suitable computing device. For example, the first device may be first device 110 of FIG. 1, and may be any of a mobile phone, IOT device, laptop, wearable device, or any other computing device capable of receiving, storing, and transmitting data on behalf of an authorized user.

At step S201, a first biometric sample is received from the user at the first device. The user may use a biometric reader of the first device to capture and store his or her biometric sample onto the first device. Examples of biometric readers can include cameras, voice recorders, fingerprint readers, palm print readers, iris scanners, retina scanners, etc. The biometric reader may be capable of representing captured biometric samples as digital files from which necessary information can be extracted and analyzed. For example, the biometric reader may be capable of representing a user's face as a matrix of pixel values or representing a sample of the user's voice as a stream of discrete numbers.

At step S202, a first biometric template is generated from the first biometric sample of the user. For example, an image file of the user's face captured in step S201 may be retrieved from temporary memory and may be analyzed using a template generation algorithm, as previously mentioned. Characteristics captured at distinct data points, or "minutiae," of the biometric sample may be analyzed to determine unique features of the user's biometric. These features may be generated into an array that can be compared to a second template generated at a later point in time for matching and verification of the user. For example, for generating a reliable biometric template of a user's face, a trained algorithm can be used to transform a matrix of face image data into its principal components. These components may be then be recorded as an average or composite image, against which comparisons can be made. Further information regarding extraction of biometric features from sample data can be found at: Kirby, M., Sirovich, L.: Application of the Karhunen-Loeve procedure for the characterization of human faces. IEEE Trans. Pattern Anal. Mach. Intell. 12(1), 103-108 (1990).

At step S203, the first biometric template is encrypted and stored in a local memory of the first device. For example, a DES, triple DES, or AES encryption algorithm, in conjunction with an established encryption key, can be used to encrypt the first biometric template. In one embodiment, the established encryption key can be a symmetric encryption key, wherein encryption and decryption of the biometric template can be performed in virtually the same manner. The encryption key or an index of the encryption key may then be stored by the first device in a secure memory, such that the first device is capable of retrieving the encryption key to perform cryptographic operations (encryption/decryption) as needed.

At step S204, a second biometric sample is received from the user at a second device. The second device may be, for example, second device 120 of FIG. 1. In embodiments, the second device may be a device with which the user wishes to interact with and transmit unique data to. As such, the second device may be used to capture a biometric sample of the user, such that the second device may provide proof to the first device that the authorized user is present. The second biometric sample of the user may be captured by the second device using a biometric reader similar to that of the first device. In this manner, a comparable biometric sample may be obtained for use in matching against biometric data previously obtained by the first device in earlier steps.

At step S205, a second biometric template is generated from the second biometric sample of the user. For example, unique features of the user's face may be extracted from the second biometric sample by the second device in a manner similar process performed by the first device in step S202 when generating the first biometric template.

At step S206, the encrypted first biometric template is received from the first device. In one embodiment, the second device may wirelessly broadcast (e.g. over WiFi, Bluetooth, SS7 signaling, etc.) a request for a matching token (which may be the encrypted first biometric template). The first device may then send the encrypted first biometric template generated in step S203 in response, such that the encrypted first biometric template can be used as the requested matching token. In another embodiment, transmission of the encrypted first biometric template from first device to second device may be initiated by user 101. For example, the user may input a selection (e.g. via a provided input field of the first device) which may initiate the transmission of the encrypted first biometric template to a chosen device or that may broadcast the encrypted first biometric template to nearby devices over Bluetooth or other wireless means.

At step S207, upon receiving the encrypted first biometric template from the first device, the second device may generate an encoded output. In one embodiment, the encoded output may be generated by inputting the encrypted first biometric template and second biometric template into a predefined encoding function. In one embodiment, data values representing the encrypted first biometric template and second biometric template may be input into a reversible encoding function, F, programmed into the second device. Any suitable encoding function may be used. In some embodiments, the reversible encoding function F may be a secret function that may only be known to the first device and the second device.

In some embodiments, the encoding function, F, may temporarily reside on the second device, or may only be useful for a limited number of interactions (e.g., one interaction) between the first device and the second device. For example, in one embodiment, the encoding function F may be transferred from the first device to the second device once for a single transaction, and may then not be useable after the single transaction is completed. If another device wants to interact with the second device, it may need to generate its own function to share with the second device for the specific interaction desired.

The reversible encoding function F may be a function for which some process may be employed to produce the inputs of F given the outputs. This may include the application of a reversing function $F^{-1}$. Examples include the binary exclusive-OR function $F(A,B)=A \oplus B$ (where "$\oplus$" is the binary exclusive-OR operator). This function may be reversed by repeating the exclusive-OR operation on the output, using one of the inputs as the second operand, in other words, if $F(A,B)=A \oplus B$ then $F(A,B) \oplus B=A$ and $F(A,B) \oplus A=B$. This is an example of a conditionally reversible function, as it only may be reversed provided that both the output and one of the inputs is known.

Another example is an encryption function. An input plaintext message M may be encrypted using an encryption function ε with a key K in order to produce a ciphertext message C: $\varepsilon_K(M)=C$. This may be reversed by a decryption function δ and a second key (which in the case of symmetric encryption may be the same as the original key K) to produce the original message M: $\delta_K(C)=M$. This is another example of a conditionally reversible function, as it may only be reversed given that the encryption and decryption keys are known. In general, a reversible function satisfies the property $X=F^{-1}(F(X, *), *)$, which indicates that an input X can be produced using the reversing function $F^{-1}$ applied to the original function $F(X, *)$ and potentially some other input or inputs (denoted by the "*" symbols, which may include other inputs such as cryptographic key).

Yet another example is a periodic function F over a defined domain, such as a sum of sinusoidal functions: $F(X)=\Sigma_i(A_i*\cos(B_iX))$, where $A_i$ and $B_i$ are constants. Typically a periodic function is non-reversible, as a single output value corresponds to an infinite number of input values. However, a periodic function may be reversible over some domain, and thus knowing that domain, it may be possible to determine the input of the function X given the output F.

At step S208, the encoded output of the function, F, is transmitted to the first device by the second device. For example, the encoded output, $F[\varepsilon(X),Y]$, may be wirelessly transmitted to the first device as a data message(s) sent over WiFi or Bluetooth. In one embodiment, one or more data messages communicating the encoded output between the second and first device may be encrypted using asymmetric encryption. For example, messages between the first and second device may be encrypted using a shared secret, such as through Diffie-Hellman key exchange or other suitable cryptographic protocol.

At step S209, the encoded output is received and decoded by the first device to recover the encrypted first biometric template and second biometric template of the user. The first device may store the reversing function $F^{-1}$ which may be used to reverse $F[\varepsilon(X),Y]$. This may allow the first device 110 to recover the encrypted first biometric template $\varepsilon(X)$ and second biometric template Y.

As noted above, the functions F and F may include any suitable number of type of algorithms that can produce an encoded output and recover the inputs from the encoded output. An example of an encoding function that is reversible may include a symmetric encryption algorithm, such as the Advanced Encryption Standard (AES), which can encode data with a symmetric key, and can decode the encoded data with the symmetric key. This may also include encryption algorithms or cryptosystems which make use of public private key pairs, such as RSA. In some embodiments, an encryption algorithm may be present on first and second devices, and symmetric encryption keys may be shared between the devices using any suitable method including a Diffie-Hellman key exchange process. In some embodiments, the encryption keys may be generated by the first device and may be ephemeral keys that can only be used for a limited time and/or for a limited number of transactions. One key of a key pair generated by the first device may be transferred to the second device using a key exchange protocol such as Diffie-Hellman.

At step S210, the encrypted first biometric template is decrypted by the first device. For example, the first device may retrieve the encryption key used for encryption of the first biometric template in step S203. The first device may then use the retrieved encryption key and corresponding decryption algorithm to convert the encrypted first biometric template into the unencrypted first biometric template. The encrypted first biometric template may be have been previously stored in memory in the first device, prior to being transmitted to the second device. Alternatively, the encrypted first biometric template may be have been received from the second device in the form of the encoded output, $F[\varepsilon(X),Y]$. In some embodiments, the decrypted versions of the encrypted biometric templates stored in memory as well as received from the second device may be compared. This can help to ensure that the device which received the encrypted first template from the first device, is the same one that is supposed to be supplying the second template.

At step S211, the second biometric template is compared to the decrypted first biometric template (e.g., either obtained from the memory of the first device or from the second device in the form of an encoded output) to determine a match. For example, a matching algorithm can be used to compare the data values of the first and second biometric templates and determine a confidence level that the first and second templates are of the same person. If the confidence level is above a predetermined threshold (e.g. above 95%), the first device may then consider the first and second biometric templates matching and of the same person. Further information regarding comparison and matching of biometrics can be found at:

Anil K. Jain, Stan Z. Li, Handbook of Face Recognition, Springer-Verlag New York, Inc., Secaucus, NJ, 2005.

At step S212, unique data is transmitted from the first device to the second device if the first biometric template and second biometric template match. For example, the unique data may be access credentials for entering a building controlled by the second device. As another example, the second device may be an IOT device (e.g. a smart vehicle or smart thermostat), and the unique data may be user settings preferred by the user, such as seat and mirror adjustments, climate settings, etc. In yet another example, the second device may be a point-of-sale terminal used to process a payment with a merchant, and the unique data may be payment information of the user.

Figure 3:
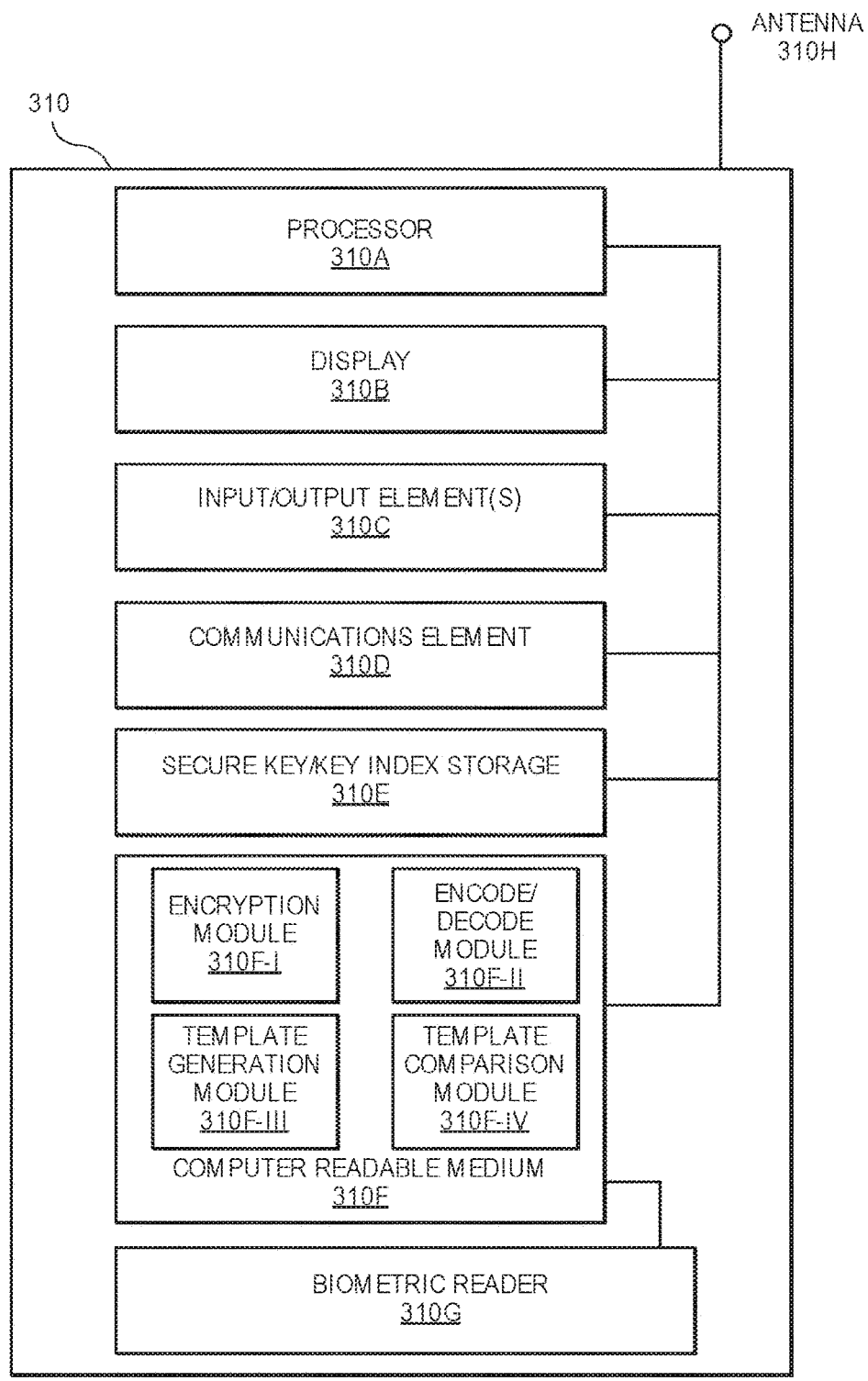
FIG. 3 shows a block diagram of a device according to an embodiment.

FIG. 3 shows a block diagram of a device according to an embodiment. Device 310 may be a computing device capable of receiving, transmitting, and storing data. For example, device 310 may be first device 110 or second device 120 of FIG. 1.

Device 310 may comprise a processer 310A for executing computer-readable instructions, such as code. The computer-readable instructions may be stored in computer-readable medium 310F, which may be a memory such as random access memory (RAM). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Device 310 may further comprise a display 310B for displaying data to a user of device 310. The user may be, for example, user 101 of FIG. 1. Device 310 may also comprise input/output element(s) 310C, which may be one or more elements for processing data communicated between device 310 and the user. For example, the input/output element(s) 310C may comprise push buttons, touchscreen elements, voice command elements, etc.

In addition, device 310 may comprise a communications element 310D, which may provide capabilities for receiving, transmitting, and reformatting messages sent over antenna 310H. For example, communications element 310D may be a communications interface for communicating with a wireless network of one or more protocols such as Bluetooth low energy (BLE), Long term evolution (LTE), 5G, near field communications (NFC), RFD, etc.

Furthermore, as previously explained, device 310 may be capable of performing secure verification processes through the use of biometric verification and cryptographic operations. For example, device 310 may comprise biometric reader 310G, which may be a sensing device for capturing biometric samples and representing said samples as analyzable data. Device 310 may also comprise secure key/key index storage 310E, which may be a hardware element for securely storing encryption keys and/or indexes thereof. For example, secure key/key index storage 310E may comprise a hardware security module (HSM), tamper-resistant secure element (SE), or host card emulator (HCE). In embodiments, secure verification processes may be implemented through the use of executable code programmed into device 310.

Computer readable medium 310F may comprise one or more modules of executable code for carrying out embodiments. Encryption module 310F-I may comprise code for carrying out cryptographic operations and managing one or more encryption keys. For example, encryption module 310F-I may comprise one or more encryption algorithms and/or secure hashing algorithms, and may further comprise one or more key derivation functions.

Encode/decode module 310F-II may comprise code for generating and decoding encoded function outputs. For example, encode/decode module 310F-11 may comprise code for a predefined function for which encrypted and/or clear text biometric template values can be used as inputs to produce an encoded output. The encode/decode module 310F-II may further comprise code for recovering original inputs from an encoded output. In one embodiment, encode/decode module 310F-H may comprise code for generating and verifying zero-knowledge proofs. For example encode/decode module 310F-II may comprise code for generating proofs using binary circuits, such as through succinct non-interactive arguments of knowledge (SNARKs), homomorphic encryption, and/or secure multiparty computation (SMPC). More information regarding zero knowledge protocols for circuits can be found at: Giacomelli, I., Madsen, J., & Oriandi, C. (2016). ZKBoo: Faster Zero-Knowledge for Boolean Circuits. IACR Cryptology ePrint Archive, 2016, 163.

Template generation module 310F-III may comprise code for generating a biometric template of a user from a biometric sample. In embodiments, the biometric, template may be generated using a template generation algorithm that extracts features from one or more recorded biometric sample(s). For example, template generation may comprise a trained algorithm that can analyze a set of image data (e.g. one or more images of face(s)) and may determine unique features for expression as a comparable data file.

Template comparison module 310F-IV may comprise code for comparing a first and second biometric template to determine if a match is present. For example, template comparison module 310F-IV may comprise a matching algorithm which may compare data values between a first facial template and a second facial template to determine a measure of probability that the templates are derived from the same user. Upon determination of high probability of a match between templates, a user may be verified and/or authorized to perform the controlled task.

Figure 4:
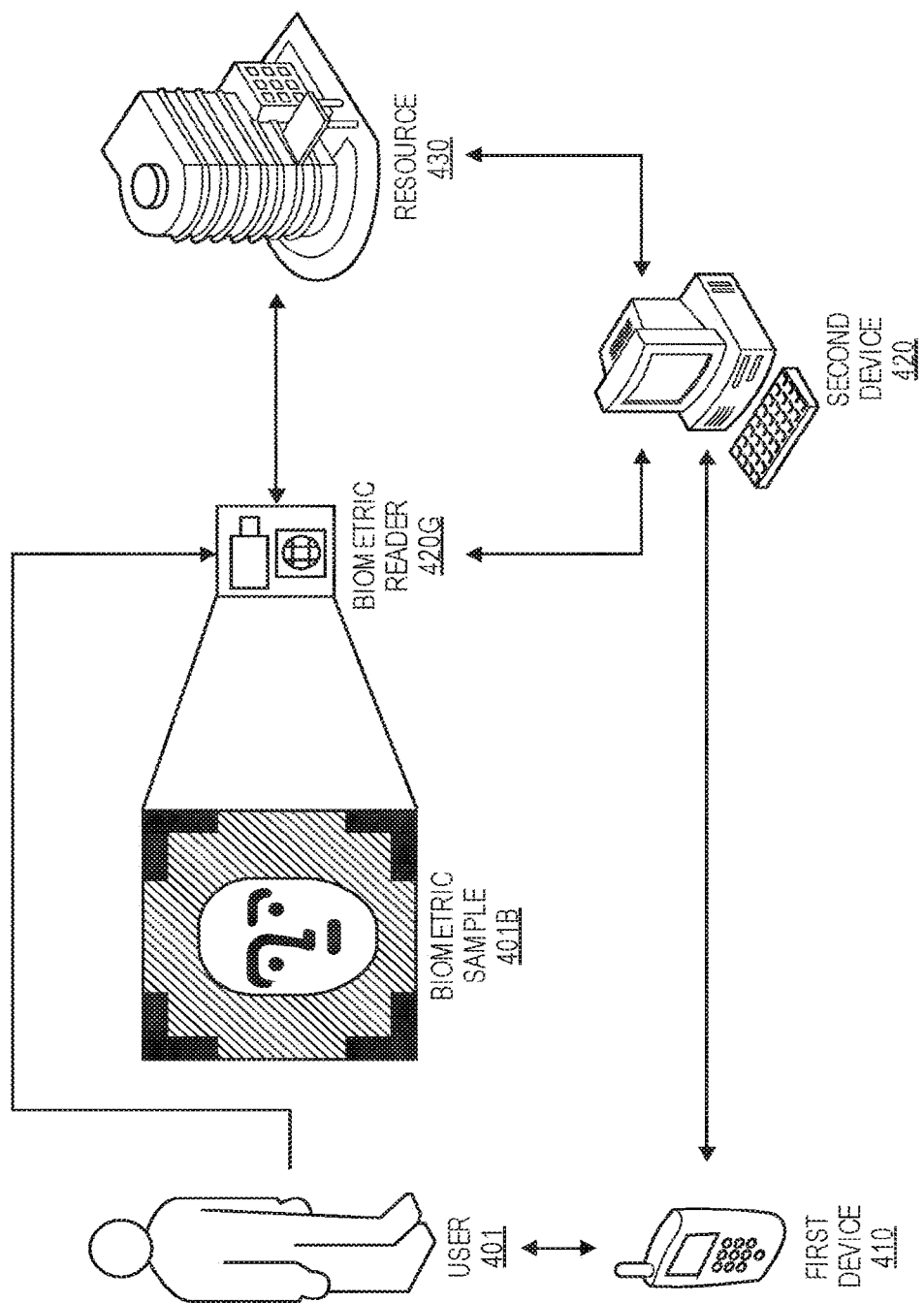
FIG. 4 shows an illustration of biometric verification for entry into an access point according to embodiments of the invention.

FIG. 4 shows an illustration of biometric verification for entry into an access point according to embodiments. It should be understood, that although FIG. 4 depicts entry into a building, methods described can also be applied to verification for entry into any number of physical or virtual access points, such as entrance into a terminal, vehicle, network, database, or asset holding accounts.

In embodiments, a user 401 of a first device 410 may approach a biometric reader 420G. The biometric reader 420G may be coupled to or incorporated in a second device 420, which may control access to a resource, such as resource 430. For example, user 401 may be an employee and first device 410 may be an electronic credential holding device (e.g. a mobile phone or access card). Further in the example, resource 430 may be an office building, and biometric reader 420G may be a face scanning intercommunication device (intercom) located near the building entrance. As such, the second device 420 may be a control device, which may accept user access credentials as a trigger for actuating the locking mechanism at the entrance, thereby granting access to resource 430.

To transmit stored credentials on first device 410 and gain entrance into the building, the user may first present his or her biometric sample(s) to the intercom system. For example, a video recorder of the intercom may record images of the user face. The intercom system may then transmit the biometric sample(s) as a data file to the second device 420 for processing. The second device may generate a template from the biometric sample(s) (i.e. face data) of the user 401, and may wirelessly retrieve a matching token (e.g., an encrypted first biometric template) from the first device 410. The second device 420 may then pass the matching token and biometric template through an encoding function, and may transmit the resulting output to the first device 410.

Upon receiving the output of the encoding function from the second device 420, the first device 410 may decode the output to recover the biometric template, which it may compare to a locally stored template and determine a match. If the templates match above a predetermined threshold (e.g. above a 99% confidence level), the first device 410 may then transmit the stored credentials to the second device 420, so that the second device 420 may actuate the building doors and allow the user entry.

Figure 5:
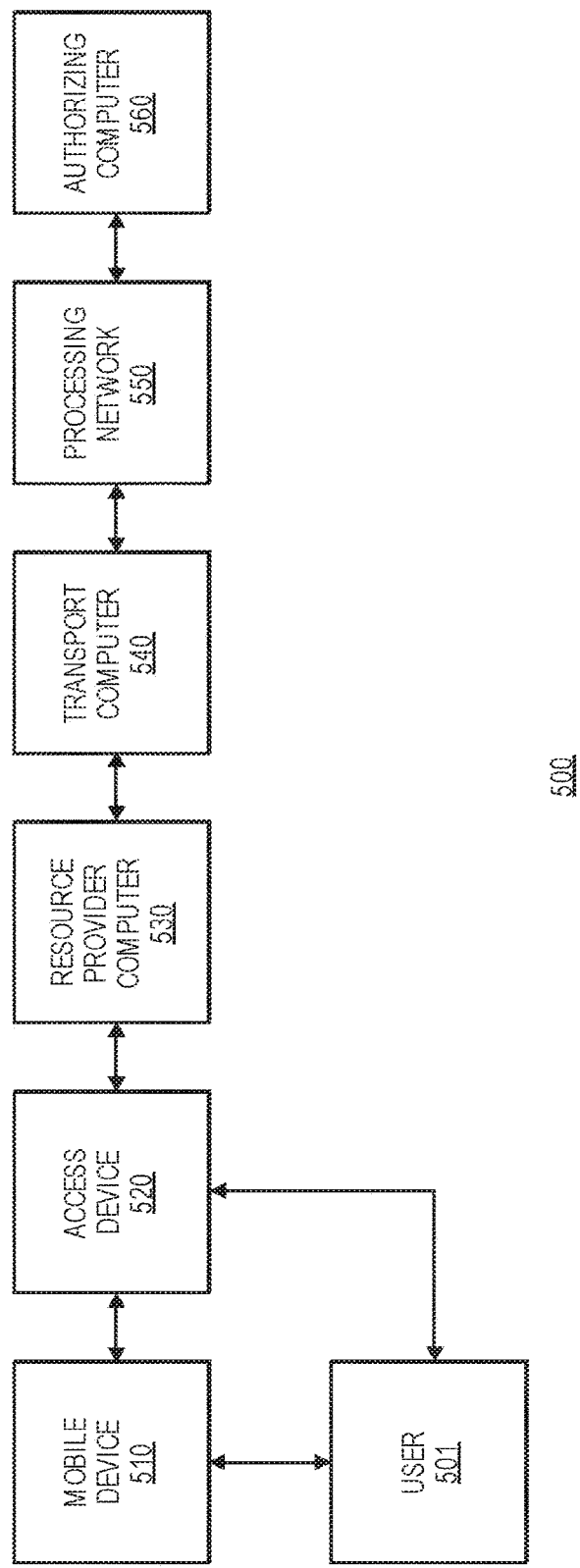
FIG. 5 shows a diagram of a system for authorizing a user according to embodiments of the invention.

FIG. 5 shows a diagram of a system for authorizing a user according to embodiments. System 500 may comprise a user 501 of a mobile device 510. In embodiments, user 501 may be user 101 and/or user 401 of FIG. 1 and FIG. 4 respectively. The user 501 may initiate an interaction with an access device 520, and may establish communications between his or her mobile device 510 and access device 520. In embodiments, mobile device 510 may be analogous to the first device 110 in FIG. 1, while the access device 520 may be analogous to the second device 120 in FIG. 1. As one example, the mobile device 510 may be a user's mobile phone or payment card, and access device 520 may be a point-of-sale terminal that can receive an account credential (e.g., an account number or payment token) from the mobile device.

The access device 520 may be in communication with a resource provider computer 530, which may be a computer and/or server computer of a resource provider with whom the user wishes to interact with and gain access to resources. For example the resource provider computer 530 may include one or more servers of a merchant from which the user 501 wishes to obtain goods or services.

The resource provider computer 530 may be in communication with a transport computer 540, which may be a server of an acquiring entity that processes transactions on behalf of the resource provider. For example, the acquiring entity may be a financial institution that accepts credit card payments from users and transfers associated funds to the resource providing merchant.

System 500 may further comprise processing network 550, through which the acquirer computer 540 may exchange information and data with an authorizing computer 560, so as to conduct, authorize, clear, and settle transactions. For example, the processing network 550 may be a transaction processing network that facilitates a transfer of funds between a financial account of user 501 maintained by authorizing computer 560, to a financial account of a merchant maintained by acquirer computer 540.

According to embodiments, user 501 may present a biometric sample to access device 520 for matching against a biometric template stored on the mobile device 510.

Upon successful matching, user credentials stored on mobile device 510 may be transmitted to the access device 520 and forwarded to authorizing computer 560 in an authorization request message through resource provider computer 530, acquirer computer 540, and processing network 550. Authorizing computer 560 may then authorize the user credentials by querying a database for the credentials and analyzing associated information. For example, the user credentials may be payment credentials issued by an issuing entity of the authorizing computer 560, and the authorizing computer 560 may determine if the payment credentials are associated with an existing payment account that is in good standing.

If the user credentials are legitimate and valid, the authorizing computer may generate and transmit an authorization response message comprising an indication of approval. The authorization response message may then be forwarded to access device 520 along the established channel of communication between the processing network 550, acquirer computer 540, and resource provider computer 530, such that the user 501 may complete the interaction and gain access to the controlled resource.

At the end of the day or at any other suitable period of time, a clearing and settlement process may be performed between the transport computer 540, processing network 550, and the authorizing computer 560.

Embodiments provide a number of advantages over prior systems. Embodiments allow for secure biometric verification in which a user maintains his or her own biometric data. For example, the user's biometric templates are stored locally on his or her own device and are never stored in any centralized database. This provides privacy to the user and deters criminals who tend to focus on large scale attacks of centralized data stores (e.g. hacks against central databases which contain data for several users and provide greater reward and incentive for hackers). Furthermore, the users biometric data is never sent as clear text between devices, as only encrypted and encoded data values are ever sent in data messages during the biometric verification process. In addition, according to some embodiments of the invention, a predetermined encoding function uses a matching token from a first device as an additional input when encoding a user's second biometric template at a second device. This can ensure that the verification session between the first and second device has not been compromised, and may prove to the first device that the second device is, in fact, the device the user intends to interact with.

Any of the computer systems mentioned herein may utilize any suitable number of subsystems. In some embodiments, a computer system includes a single computer apparatus, where the subsystems can be the components of the computer apparatus, in other embodiments, a computer system can include multiple computer apparatuses, each being a subsystem, with internal components.

A computer system can include a plurality of the same components or subsystems, connected together by an external interface. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Pen using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method comprising:
receiving, by a second device from a first device, an encrypted first biometric template generated from a first biometric sample of a user of the first device;
receiving, by the second device, a second biometric sample from the user of the second device;
encrypting, by the second device, the second biometric sample received from the user of the second device;
generating, by the second device, a second biometric template from the second biometric sample of the user;
inputting, by the second device, the encrypted first biometric template and the second biometric template generated from the second biometric sample of the user into a function;
generating, by the second device, an encoded output based on the function;
transmitting, by the second device to the first device, the encoded output generated from the encrypted first biometric template generated from the first biometric sample of the user and the second biometric template generated from the second biometric sample of the user; and receiving, by the second device from the first device, unique data based on a match result from a comparison of a decrypted first biometric template and second biometric template.

2. The method according to claim 1, wherein the second biometric template is stored in a local memory of the second device.

3. The method according to claim 2, wherein the generating the second biometric template from the second biometric sample of the user comprises:
retrieving an image file associated with the user from the local memory of the second device; and
analyzing the image file using a template generation algorithm.

4. The method according to claim 1, wherein the second device is configured for controlling access to a resource.

5. The method according to claim 4, wherein the resource comprises entry into a physical environment or a virtual environment.

6. The method according to claim 1, wherein the encrypted first biometric template generated from the first biometric sample of the user of the first device is received in response to a request by the second device.

7. The method according to claim 1, wherein the first biometric sample and the second biometric sample comprise data relating to a face of the user or a fingerprint of the user.

8. The method according to claim 1, wherein the function is an encoding function programmed into the first device and the second device.

9. The method according to claim 1, wherein the first device is a card, and the second device is a terminal.

10. The method according to claim 1, wherein the function is reversible.

11. The method according to claim 1, wherein the unique data is data that allows the user to access a secure location.

12. The method according to claim 1, wherein the unique data is data that allows the user to access secure data.

13. A second device comprising:
a processor; and
a computer readable medium storing code executable by the processor, wherein the code comprises instructions for implementing a method comprising:
receiving, from a first device, an encrypted first biometric template generated from a first biometric sample of a user of the first device;
receiving a second biometric sample from the user of the second device;
encrypting the second biometric sample received from the user of the second device;
generating a second biometric template from the second biometric sample of the user;
inputting the encrypted first biometric template and the second biometric template generated from the second biometric sample of the user into a function;
generating an encoded output based on the function;
transmitting, by the second device to the first device, the encoded output generated from the encrypted first biometric template generated from the first biometric sample of the user and the second biometric template generated from the second biometric sample of the user; and
receiving, from the first device, unique data based on a match result from a comparison of a decrypted first biometric template and second biometric template.

14. The second device according to claim 13, wherein the second biometric template is stored in a local memory of the second device.

15. The second device according to claim 14, wherein the generating the second biometric template from the second biometric sample of the user comprises:
retrieving an image file associated with the user from the local memory of the second device; and
analyzing the image file using a template generation algorithm.

16. The second device according to claim 13, wherein the second device is configured for controlling access to a resource.

17. The second device according to claim 13, wherein the encrypted first biometric template generated from the first biometric sample of the user of the first device is received in response to a request by the second device.

18. The second device according to claim 13, wherein the first biometric sample and the second biometric sample comprise data relating to a face of the user or a fingerprint of the user.

19. The second device according to claim 13, wherein the function is an encoding function programmed into the first device and the second device.

20. The second device according to claim 13, wherein the first device is a card, and the second device is a terminal.

* * * * *